United States Patent [19]

Miller

[11] 4,071,226
[45] Jan. 31, 1978

[54] PORTABLE CONCRETE PROPORTIONING MIXER

[76] Inventor: Charles R. Miller, 2020 Placentia Drive, Hacienda Heights, Calif. 91745

[21] Appl. No.: 742,515

[22] Filed: Nov. 16, 1976

[51] Int. Cl.² .................... B28C 5/34; B01F 7/08
[52] U.S. Cl. ........................ 366/64; 214/83.32; 366/35
[58] Field of Search ............... 259/165, 161, 162, 169, 259/172, 164, 179, 178 R, 7, 21, 22, 40, 41, 42, DIG. 10, 13, 31; 214/83.32; 198/548, 558

[56] References Cited

U.S. PATENT DOCUMENTS

| | | | |
|---|---|---|---|
| 2,054,043 | 9/1936 | Pipes | 259/178 R |
| 3,456,925 | 7/1969 | Gallagher | 259/161 |
| 3,575,306 | 4/1971 | Obermeyer | 214/83.32 |
| 3,664,525 | 5/1972 | Herbsthofer | 214/83.32 |
| 3,721,333 | 3/1973 | Boone | 214/83.32 |
| 3,938,684 | 2/1976 | Quoiffy | 214/83.32 |

FOREIGN PATENT DOCUMENTS

| | | | |
|---|---|---|---|
| 2,259,752 | 6/1973 | Germany | 259/42 |
| 1,015,085 | 12/1965 | United Kingdom | 259/178 R |

*Primary Examiner*—Herbert F. Ross
*Attorney, Agent, or Firm*—Huebner & Worrel

[57] ABSTRACT

A portable proportioning mixer, adaptable to mix concrete or other material, such as fertilizer and plastics, including a plurality of separate hoppers with discharges at their lower ends; a conveying and mixing trough adapted to receive materials from the hoppers, and a transporting vehicle for carrying the hoppers and mixing trough. The mixing trough is adapted to be carried on the vehicle in a non-receiving position during transportation, the trough being pivotally mounted on the vehicle to be rotated from the non-receiving position to a receiving position to receive materials from the hoppers; the mixing trough having a lower end positioned under the hopper discharges when in the receiving position and having receiving openings complementary to the hopper discharges.

14 Claims, 7 Drawing Figures

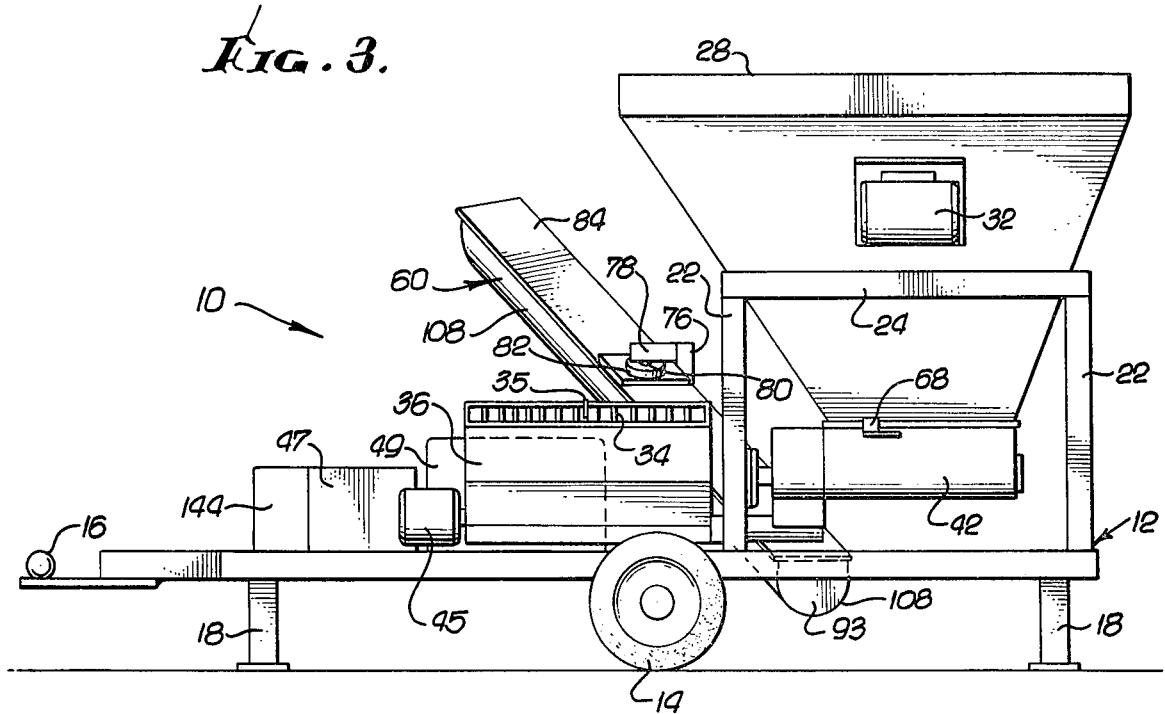
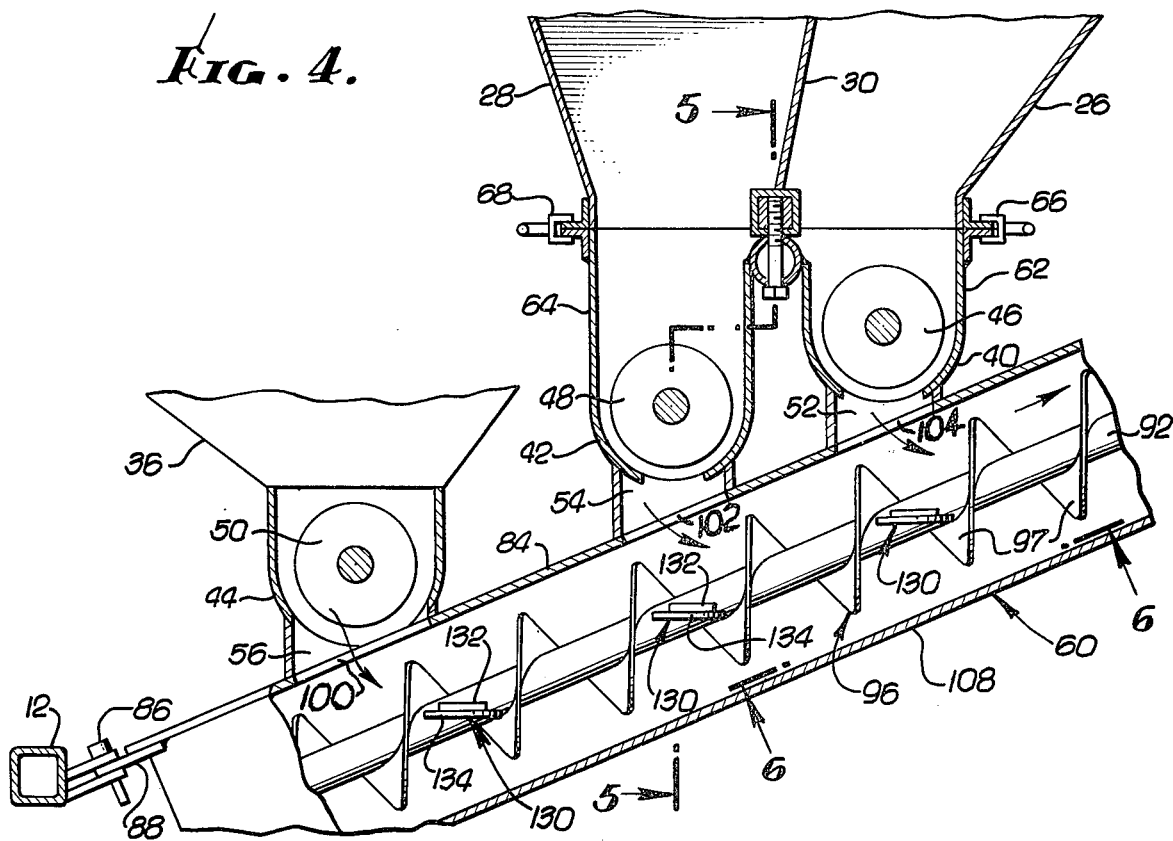

PORTABLE CONCRETE PROPORTIONING MIXER

BACKGROUND OF THE INVENTION

In the prior art portable concrete batch plants have been generally made with the main mixing and conveying trough fixed in place for both transportation and mixing. This requires that the mixing trough extend outwardly of the carrying frame so as to make an inordinately long unit. It also required that the hoppers be positioned higher because most of the portable batch plants have been adapted for use in remote areas requiring off-road travel. That is, the structure had to be higher above the traveling surface to avoid damage to the lower ends of the mixing troughs under the hoppers, for example.

Because the troughs were fixed in place, they were made to extend excessively high, along with the hoppers, so as to raise the center of gravity of the units, creating a number of problems. One obvious problem was tipping on off-road terrain.

In order to attempt to lower the center of gravity, the hoppers were made wider to lower them, and this resulted in sides that were not as steep as desirable for continuous discharge of sand, aggregate and other materials.

Where the hoppers were in fact higher, they were more difficult to fill with a skip loader and they usually were positioned so that the skip loader could fill from only one side, having to pass over one hopper in order to dump into an adjacent hopper.

Other problems in the prior art batch plants were in the conveying trough mixing paddles which functioned at a relatively low level of mixing efficiency.

SUMMARY OF THE INVENTION

The present invention provides a portable concrete proportioning mixer which is carried on a vehicle frame, usually having two wheels, and which is particularly adapted to travel on off-road terrain to relatively remote sites where the typical ready-mix trucks cannot be used efficiently.

In the present invention, the main mixing and conveying trough is pivotally mounted on the vehicle frame to be rotatable from a transporting position to an operating position.

In addition, the invention provides improved mixing paddles for the mixing and conveying trough in which the mixing paddles are arranged to be spaced from an auger shaft. By this arrangement, the mixing paddles fluff up the material being mixed and conveyed from low areas of rotation to high areas, permitting the fluffed up material to drop to other low areas for better mixing. By having the mixing paddles spaced from the auger shaft, other material being mixed is permitted to drop through the spaces on both their up and down sides of rotation for better mixing.

Accordingly, it is an object of the invention to provide an improved portable concrete proportioning mixer.

It is another object of the invention to provide an improved proportioning mixer, as described in the previous paragraph, in which the top of the vehicle can be made lower because the mixing and conveying trough is not fixed under the hoppers during transportation. This eliminates a top-heaviness problem. Similarly, the bottom of the vehicle frame can be made higher off the ground in that the lower part of the vehicle is limited by the position of the bottoms of the hoppers and not by the mixing and conveying trough, which is carried higher than the hopper discharges during transportation. This provides a considerable advantage for off-road travel.

It is still another object of the invention to provide a proportioning mixer, as described in the previous paragraphs, in which the hoppers can be made effectively larger than in plants where the trough is fixed thereunder for transporting. That is, because the lower ends of the hoppers may be positioned lower for transporting than with the trough thereunder, they can extend upwardly from a lower position so as to be effectively higher and be limited only by road width limits. By being able to make the hoppers effectively higher, they can be made with more nearly vertical sides for rapid discharge.

It is a further object of the invention to provide a proportioning mixer, as described in the previous paragraphs, in which the unit is shortened by having the main mixing and conveying trough rotated to ride on the vehicle alongside the hoppers, rather than thereunder. Thus, during transportation, the trough does not extend beyond the vehicle frame, but only extends beyond the vehicle frame when it is rotated for operation to position the receiving ends under the hopper discharges and to position the trough discharge outwardly of the vehicle frame over a receiving container.

It is a still further object of the invention to provide an improved proportioning mixer, as described in the previous paragraphs, in which the hoppers can be easily filled by skip loaders because the hopper tops are lower. Where the hoppers are positioned together, separated by a common wall, each hopper can be filled from the most convenient side by skip loaders.

It is another object of the invention to provide an improved mixing and conveying trough having mixing paddles spaced from the auger shaft and positioned between the helical or spiral blades of the auger.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 3 is a side elevational view, taken along the lines 3—3 in FIG. 2;

FIG. 4 is a fragmentary partially cross-sectional view, illustrating the hoppers'-conveying trough feeding arrangements, taken along the lines 4—4 in FIG. 1;

DESCRIPTION OF THE PREFERRED EMBODIMENTS

Figure 1:
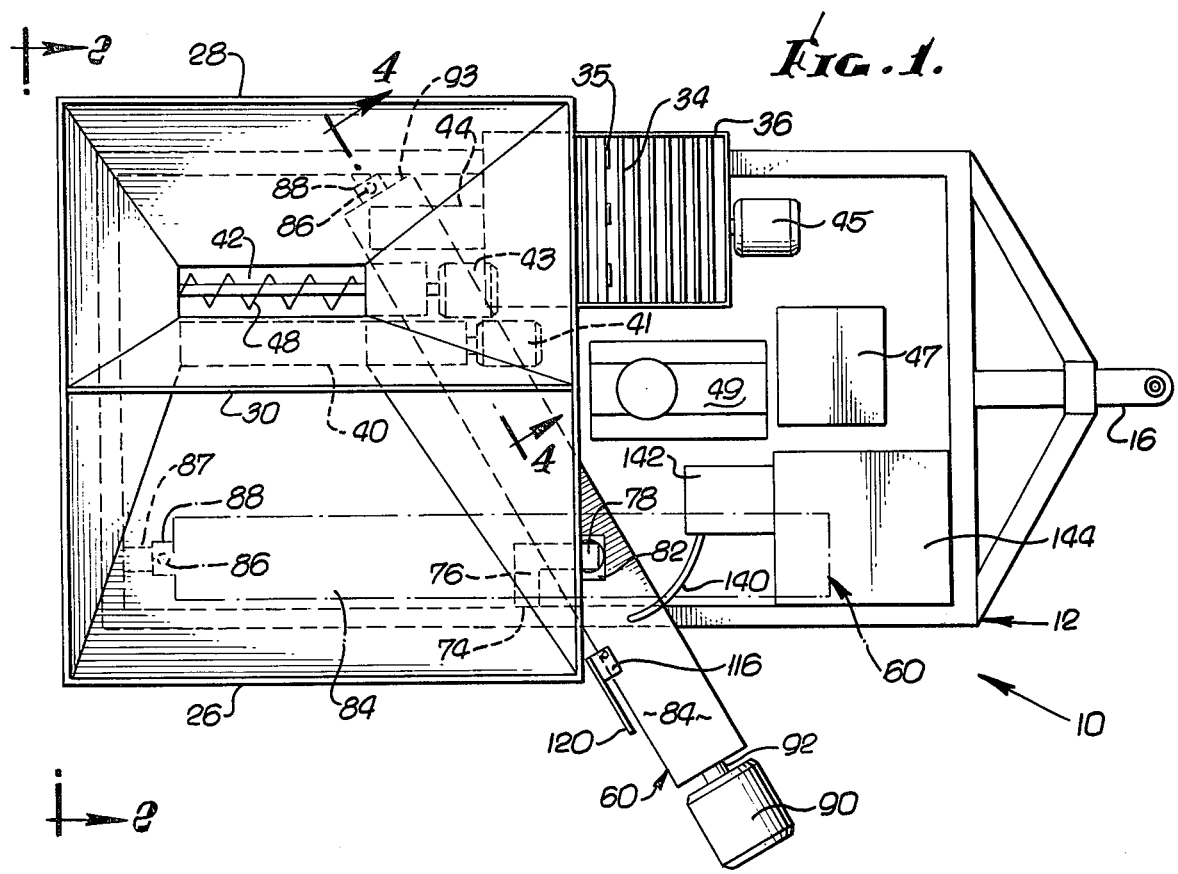
FIG. 1 is a plan view of a portable concrete proportioning mixer, according to the invention.
Figure 2:
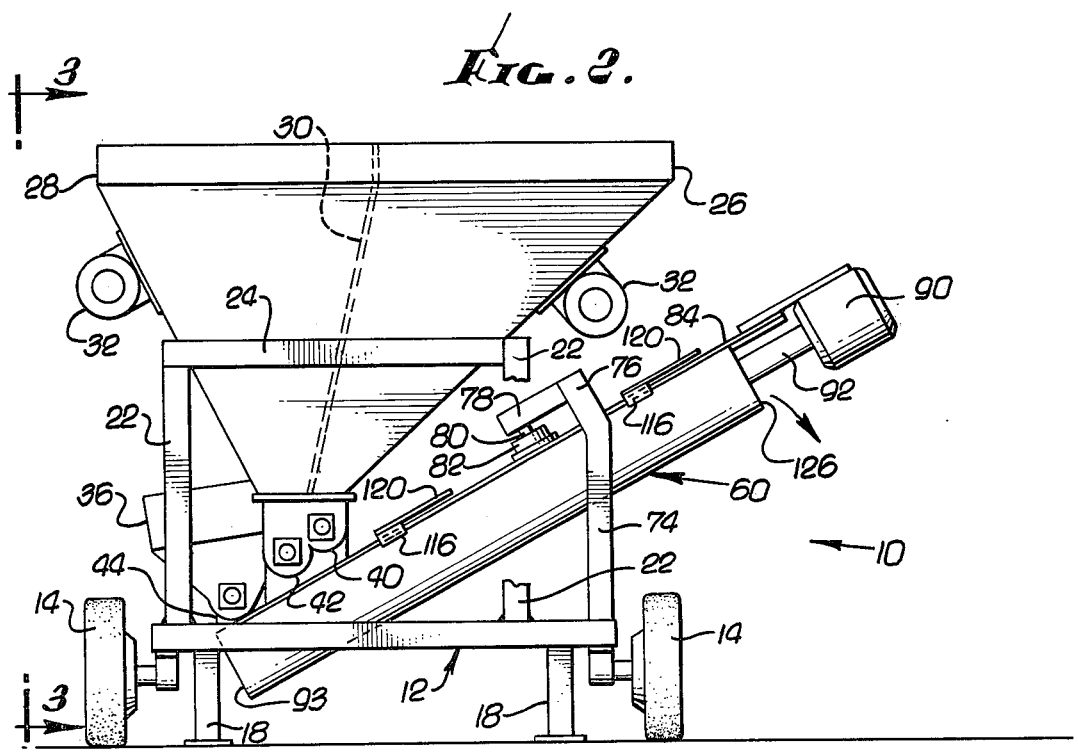
FIG. 2 is a rear end elevational view, taken along the lines 2—2 in FIG. 1.

Referring again to the drawings, a portable concrete proportioning mixer, generally designated as 10, is shown in FIGS. 1-3. The plant is carried on a two-wheeled vehicle having a horizontal frame 12. During transport the vehicle moves and is supported on wheels 14 and the trailer connection 16.

During the concrete batch making operation, the frame 12 is supported on the five stabilizers 18 which are lowered from their transport positions (not shown) to those shown in the drawings. Support is also provided by the wheels.

As shown in FIGS. 2 and 3, extending upwardly from frame 12 are four vertical hopper supports 22, joined by a rectangle of four horizontal hopper supports 24. Downwardly tapering sand and aggregate hoppers 26 and 28, having a common separating wall 30, are fitted within the horizontal supports 24. Each of the hoppers has a vibrator motor 32 attached to accelerate the downward movement of the sand and aggregate therein. The tops of the hoppers are open and can be filled from their outer sides or ends by a skip loader, for example.

As shown in FIGS. 1-3, a downwardly tapering cement hopper or bin 36 is also supported on the frame 12. The cement bin is waist high, having a grating 34 and bag breakers 35 on the top. As best seen in FIGS. 1-5, the hoppers terminate at their lower ends in a feeding trough, each having a discharge opening. Motor driven within the sand, aggregate and cement troughs 40, 42, 44 are bearing mounted helical cylindrical feeding augers 46, 48, and 50, respectively. The motors 41, 43, 45 are hydraulic and powered by a hydraulic pump 47, driven by a gasoline or diesel engine 49.

The feeding trough discharge openings 52, 54 and 56 are conveniently positioned adjacent their ends to feed a mixing and conveying trough 60, to be described.

As shown in FIG. 4, the troughs 40 and 42 have outer covers 62 and 64, removable for cleaning by hand operable releases 66 and 68, respectively.

The mixing and conveying trough, generally designated as 60, as best seen in FIGS. 1-4, is supported on the frame 12 by a vertical post 74, terminating in an inwardly inclined member 76 from which extends, at a right angle, a pivot supporting arm 78. A pivot shaft 80 is secured in the arm 78 and is bearing mounted for rotation in a bearing housing 82, secured to top frame member 84 of the trough 60.

The trough 60 is adapted to be pivoted on the shaft 80 into two positions, one for transport and the other for operation. The transport position is shown in FIG. 1 in phantom outline, the trough extending, substantially horizontally, in the elongated direction of the frame 12 and within its confines. It is secured in place, adjacent its closed end 93, by a vertical pin 86 extending through overlapping ears 87 and 88 on frames 12 and 84, respectively, as illustrated in FIG. 4 in the operating position. For operation the trough 60 is rotated on the pivot to the position shown in full lines in FIGS. 1-5, secured as shown in FIG. 4 at its lower end 93. The operation angle is about from 20° to 27° to the horizontal.

A hydraulic motor 90, operated by the pump 47, is supported on an extension of the frame member 84. An auger shaft 92, connected to the motor 90, drives a spiral-cylindrical mixing and conveying auger 96, having blades 97, FIGS. 4-6, within the trough 60. The shaft 92 is bearing mounted in the trough closed end 93.

Adjacent the lower end 93, the frame 84 has receiving openings 100, 102, and 104 in register with complementary discharges 56, 54, and 52 from which flow cement, aggregate and sand, respectively. The details shown on FIG. 5 for the aggregate hopper discharge are the same for the cement and sand discharges into the trough 60.

Figure 5:
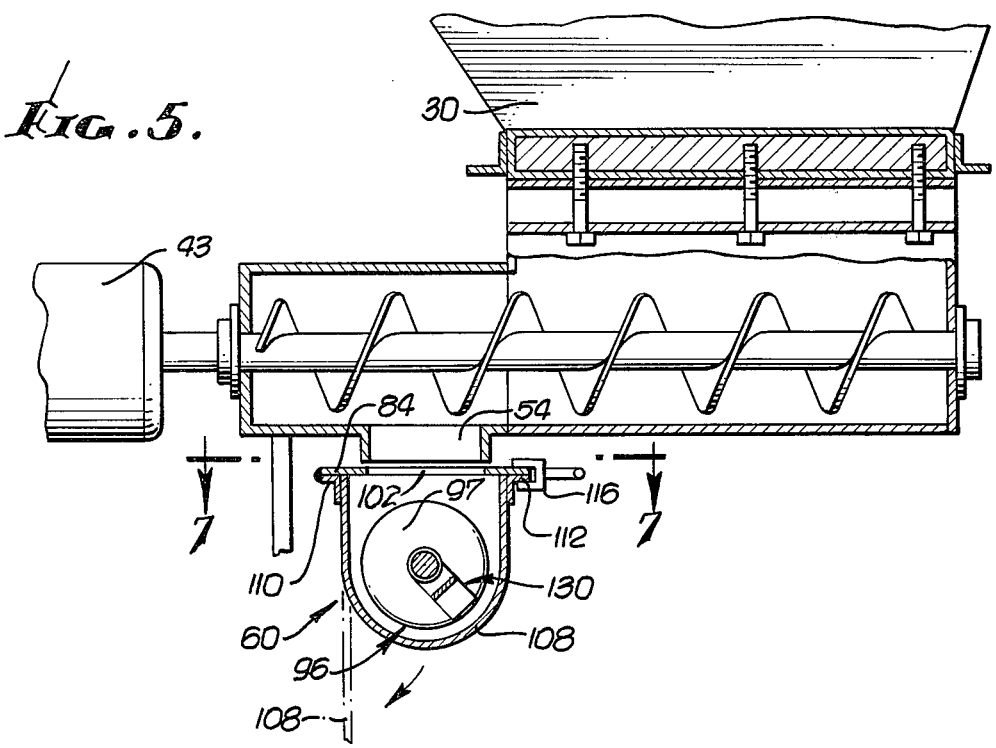
FIG. 5 is a fragmentary view, taken substantially along the lines 5—5 in FIG. 4.
Figure 7:
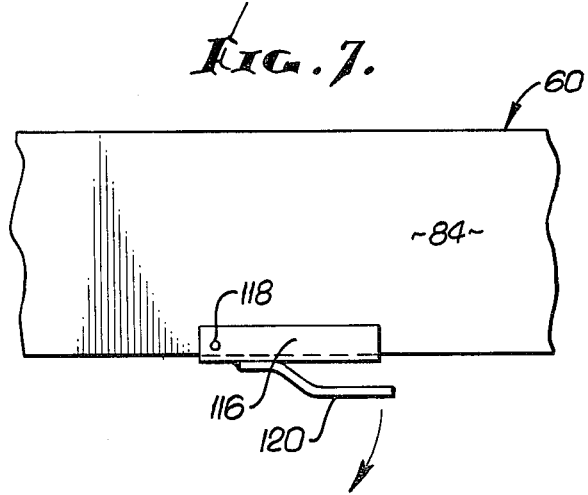
FIG. 7 is a view illustrating the conveying trough opening device, taken along the lines 7—7 in FIG. 5.

As shown in FIG. 5, a flexible U-shaped cover 108 on the trough 60 depends from flanges 110, 112 against the frame 84. The cover is an elastomeric material or a plastic, such as polyvinyl chloride. It is fixed in place at 110 and removably secured at 112 by U-shaped clamps 116, pivoted to the frame 84 at 118, FIG. 7. When handles 120 are pulled outwardly, the cover is released and drops, as shown in phantom outline in FIG. 5. This arrangement provides for easy cleaning, the cleaning being made necessary by mud-like formations between the auger and the cover, the distance between the two being about ½ inch.

The cover is closed by returning flange 112 into abutment with frame 84 and then pivoting the clamps 116 over the frame and the flange for gripping engagement.

As shown in FIG. 2, only two clamps 116 are necessary to hold the cover on the frame 84. The cover 108 extends from the closed end 93 to its upper end 126, from which mixed sand, aggregate, cement and water are discharged, as indicated by the arrow, dropping outwardly into a container, not shown, of the vehicle frame 12.

Figure 6:
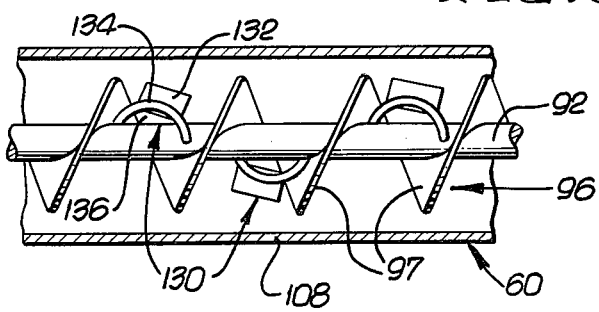
FIG. 6 is a fragmentary view illustrating mixing paddles in the conveying trough, taken along the lines 6—6 in FIG. 4.

As shown in FIGS. 4-6, mixing paddles 130 are secured to the conveying auger shaft 92, spaced between the spiral blades 97. The paddles are comprised of generally rectangular flat members 132 secured to the shaft by arced rods 134. The arced rods extend generally into the direction of the shaft but are at an angle to it, and the rectangular members, secured with a flat portion thereof to the sides of the rods, extend in the same direction. The arced rods 134, concave toward the shaft 92, provide a space for mixing flow between the paddles and the shaft.

As the spiral shaft rotates conveying and mixing the material upwardly in the trough 60, improved mixing is provided by the paddles 132. As the paddles move from a low position of rotation upwardly they fluff up some material, and carry some material with them, dropping it at a higher level, and then continuing, move other material contacted at the higher level to a lower level. Additional mixing also occurs by the passing of the material through the space 136 between the arced rods and the shaft. Thus, as the rods are rotated, some of the material flows through the spaces 136 and at low levels of rotation, of a particular rod 134 the material is allowed to move downwardly through the space, and as the rods rotate upwardly material from above is permitted to move through the spaces to cause better mixing.

As shown in FIG. 1, water is fed to the mixing-conveyor trough 60 through the frame 84 in a hose 140 connected to water pump 142, secured to the side of a tool or other equipment carrying box 144 secured to the frame 12. The water pump may be operated by the hydraulic pump 47 or directly by the engine 49.

For operation, the portable concrete proportioning mixer is conveyed to the site where the concrete is to be made with the mixing and conveying trough 60 in the substantially horizontal and elongated position, shown in FIG. 1, in which it requires no space other than required by the other equipment. When the batch plant is in location for producing concrete, the stabilizers 18 are lowered so as to adequately support it and hold it in place. At this time the pin 86 is removed from the ears 87 and 88, as shown in FIG. 1, and the mixing and conveying trough is rotated on the pivot 80 clockwise to the position shown in full lines in FIGS. 1–3.

The pin 86, as shown in FIG. 4, is inserted through the ears at the end 93 to secure the trough and its frame 84 to the vehicle frame 12. In this position the discharge openings 56, 54 and 52 of the cement, aggregate and sand hoppers, respectively, are in register to feed the materials into the receiving openings 100, 102, and 104 of the mixing and conveying trough. The engine 49 is started so as to operate the hydraulic pump 47 which causes the rotation of the feeding augers 50, 48 and 46, and the rotation of the mixing and conveying auger 96. The material can have been predampened to have a 3% moisture content, or additional water to form a slurry is supplied through the hose 140. The concrete mixture then discharges at 126, as shown in FIG. 2.

A batch plant, as shown, can vary in concrete production from a wheelbarrow full to a maximum of 18 yards of concrete per hour, the sand and aggregate hoppers being divided to contain 1½ yards of sand and 1½ yards of aggregate. The plant can be operated by one man, the sand and gravel hoppers being filled by typically using a small skip loader, and the cement hopper, being only waist high, is filled by breaking bags on the grating with the incorporated bag breakers.

The sand, aggregate and the cement motors have variable drives, having tachometers so as to be able to completely control the sand and aggregate proportions. The cement is generally varied by sack mix.

In addition to hydraulic motors, as shown, the batch plant can be operated by externally supplied electric power or by a motor generator combination.

The dimensions of the unit shown and described are length 184 inches, width 96 inches, and height 95 inches, having a weight of 3500 pounds. The sand-aggregate hopper capacity is 81 cubic feet and the cement hopper capacity is 6 cubic feet.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims, wherein various portions have been separated for clarity of reading and not for emphasis.

I claim:
1. In a portable proportioning mixer,
   a plurality of separate hoppers having discharges at lower ends thereof,
   a conveying and mixing trough adapted to receive materials from said hoppers, and
   a transporting vehicle for traveling on land and having a frame supporting said hoppers and mixing trough,
   the improvement comprising:
   said mixing trough being adapted to be carried on said frame in a non-receiving position during transportation,
   said mixing trough being pivotally mounted on said vehicle frame to be rotated from said non-receiving position to a receiving position to receive materials from said hoppers, said hoppers having lower ends at different levels relative to the trough in the receiving position,
   said mixing trough having a lower end thereof under said hopper discharges in said receiving position,
   said mixing trough being generally closed, having a plurality of receiving openings complementary to said hopper discharges in respective register therewith in said receiving position,
   said mixing trough having an upper open discharge end, and
   the lowest level of the vehicle above the land during transportation being dependent upon the lowest hopper lower end.
2. The invention according to claim 1 in which:
   said discharge and receiving ends of said mixing trough are within the plan confines of the vehicle frame when the trough is in the non-receiving position, extending generally in the direction of travel and having a lower end thereof securable to a lower frame portion.
3. The invention according to claim 2 in which:
   said upper discharge end of said mixing trough in the receiving position extends outwardly of said vehicle frame in a discharge position to be adapted to discharge into a container outwardly of said frame,
   said lower end of said trough in said receiving position being securable to a lower portion of said frame.
4. The invention according to claim 1 in which:
   said mixing trough has an auger formed of spiral blades therein,
   said auger having a central rotatable shaft bearing mounted to the mixing trough and having a rotating driving means at one end of the shaft,
   said auger being adapted to convey materials from the lower receiving end to the discharge end, and
   mixing paddles secured to said shaft and spaced between said spiral blades,
   said mixing paddles being adapted to fluff material being mixed and conveyed from low areas of rotation to higher areas of rotation and drop materials from high areas to lower areas, all of said materials being moved in the direction toward the discharge end.
5. The invention according to claim 4 in which:
   said mixing paddles having inner ends having a space between a central portion of the inner ends and said shaft to permit materials being mixed to pass between said mixing paddles and said shaft.
6. The invention according to claim 4 in which:
   said mixing paddles extend generally along the direction of said shaft at an angle to the axis of the shaft.
7. The invention according to claim 4 in which:
   said mixing paddles are secured to said shaft on rods having their ends secured to the shaft,
   the rods being secured to the mixing paddles so as to space the mixing paddles away from the shaft,
   the mixing paddles being generally rectangular and flat, having outer end portions in approximate axial alignment with outer surfaces of the spiral blades but generally radially inwardly thereof.
8. The invention according to claim 4 in which:
   arced rods have inner ends secured to said shaft between said spiral blades,
   the arcs of the rods being concave toward said shaft, said mixing paddles being secured to said arced rods along a portion thereof and being spaced from said shaft, the mixing paddles being generally rectangular and flat, having outer straight edges at an angle to said shaft, inner straight edges of said mixing paddles being generally parallel to said outer edges, said mixing paddles generally extending along said shaft at an angle to the axis thereof.

9. The invention according to claim 1 in which:

said mixing trough is substantially horizontal in the non-receiving position and is at an angle of about from 20° to 27° with the horizontal in the receiving position.

10. The invention according to claim 4 including:

a mixing trough frame forming an upper side of said trough and supporting said auger shaft, said shaft driving means, and being supported by means to pivotally mount said mixing trough on said vehicle frame, a flexible generally U-shaped wall secured to and depending from said mixing trough frame to form the under portion of said trough, said spiral blades and mixing paddles being fitted to rotate adjacent and within the U-shaped wall, said U-shaped wall being removably secured to said trough frame along an upper edge of one of said U-legs, said U-shaped wall extending from said receiving end to said discharge end.

11. The invention according to claim 1 including:

means to lock said mixing trough in said non-receiving position, and means to lock said mixing trough in said receiving position.

12. The invention according to claim 1 in which:

the bottom of the vehicle frame is limited in its nearness to the land during transportation by the lower end of the lowest hopper.

13. The invention according to claim 2 in which:

said hoppers are at various heights above the vehicle frame, said mixing trough in the non-receiving position being substantially below the top of the highest hopper.

14. The invention according to claim 1 including:

a mixing trough frame member forming an upper trough closure, means pivotally mounting said trough frame to said vehicle frame, said means pivotally mounting being a vertical post extending upwardly from said vehicle frame, said vertical post terminating in an inwardly and upwardly inclined member from which extends, at a right angle thereto, a downwardly extending pivot support arm, and a pivot shaft secured to the support arm and extending downwardly therefrom parallel to and inwardly spaced from said inclined member, said pivot shaft being mounted for rotation in and secured in a bearing housing secured to said trough frame member intermediate its ends to pivotally support said trough.

* * * * *